United States Patent
Bao

(10) Patent No.: US 10,761,741 B1
(45) Date of Patent: Sep. 1, 2020

(54) METHOD AND SYSTEM FOR MANAGING AND SHARING DATA USING SMART POINTERS

(71) Applicant: BEIJING BAIDU NETCOM SCIENCE AND TECHNOLOGY CO., LTD., Beijing (CN)

(72) Inventor: Yingze Bao, Mountain View, CA (US)

(73) Assignee: Beijing Baidu Netcome Science and Technology Co., LTD., Beijing (CN)

( * ) Notice: Subject to any disclaimer, the term of this patent is extended or adjusted under 35 U.S.C. 154(b) by 0 days.

(21) Appl. No.: 15/092,620

(22) Filed: Apr. 7, 2016

(51) Int. Cl.
| | |
|---|---|
| *G06F 12/00* | (2006.01) |
| *G06F 3/06* | (2006.01) |
| *G06F 9/48* | (2006.01) |
| *G06F 9/30* | (2018.01) |

(52) U.S. Cl.
CPC ............ *G06F 3/0619* (2013.01); *G06F 3/065* (2013.01); *G06F 3/0641* (2013.01); *G06F 9/3009* (2013.01); *G06F 9/4881* (2013.01); *G06F 12/00* (2013.01)

(58) Field of Classification Search
CPC ................................. G06F 12/02; G06F 12/00
USPC ......................................................... 711/162
See application file for complete search history.

(56) References Cited

U.S. PATENT DOCUMENTS

| | | | |
|---|---|---|---|
| 5,345,588 A | 9/1994 | Greenwood et al. | |
| 6,144,965 A * | 11/2000 | Oliver | ................. G06F 12/0261 |
| 6,345,276 B1 | 2/2002 | Lee | |
| 6,366,932 B1 * | 4/2002 | Christenson | ........ G06F 12/0261 |
| 6,493,740 B1 | 12/2002 | Lomax | |
| 6,993,771 B1 * | 1/2006 | Hasha | ..................... G06F 9/542 |
| | | | 719/313 |
| 2004/0107227 A1 | 6/2004 | Michael | |
| 2006/0037026 A1 * | 2/2006 | Doherty | .................. G06F 9/526 |
| | | | 719/310 |
| 2007/0136403 A1 * | 6/2007 | Kasuya | .................... G06F 9/461 |
| 2009/0222494 A1 * | 9/2009 | Pizlo | ................... G06F 12/0269 |
| 2011/0246727 A1 * | 10/2011 | Dice | ................... G06F 12/0261 |
| | | | 711/150 |
| 2011/0320719 A1 * | 12/2011 | Mejdrich | ............ G06F 12/0813 |
| | | | 711/120 |

OTHER PUBLICATIONS

Steensgaard, Bjarne; "Thread-Specific Heaps for Multi-Threaded Programs"; Microsoft Research; ISMM '00 Minneapolis, MN, USA, ACM 2000 1-58113-263-8/00/10, pp. 18-14.

* cited by examiner

*Primary Examiner* — Gautam Sain
(74) *Attorney, Agent, or Firm* — Knobbe, Martens, Olson & Bear LLP

(57) ABSTRACT

A computer-implemented method and system for managing and sharing data using smart pointers. The computer-implemented method includes obtaining original data and storing the original data in memory. Further, the computer-implemented method includes creating a smart pointer for the original data in a first thread. Furthermore, the computer-implemented method includes duplicating the smart pointer from the first thread to a second thread. Moreover, the computer-implemented method includes share the original data across the first thread and the second thread.

16 Claims, 4 Drawing Sheets

METHOD AND SYSTEM FOR MANAGING AND SHARING DATA USING SMART POINTERS

TECHNICAL FIELD

Embodiments of the disclosure relate generally to data structures. Embodiments relate more particularly to a computer-implemented method and system to manage and share data using smart pointers.

BACKGROUND

Device localization and environment reconstruction are two key components for several applications such as augmented reality, virtual reality, robotics and unmanned aerial vehicle. Both of these components are accomplished by software running in multi-threads style to achieve real time performance.

During execution of the software, a huge amount of data is generated and shared between different CPU threads. Examples of the data shared includes, image sensor input, motion sensor input, processed results of raw input, 3d structure estimation, position and orientation estimation.

A fundamental requirement of the aforementioned applications in real time is computational capacity. However, the computational capacity is limited and consequently is critical to overcome the limitation.

Traditional methods to share data between threads are performed by duplicating original data. Duplicating original data avoids the risk of simultaneously modifying the same memory data by multiple threads. However, this method is very computational and expensive. An alternate method allows only one thread to alternate the shared data. This method avoids the cost of duplicating data however it decreases the efficiency of the software.

In the light of the above discussion, there appears to be a need for an efficient method to share and manage data without affecting the original data.

OBJECT OF INVENTION

The principal object of the embodiments herein is to provide an easy-to-implement and efficient method for managing and sharing data between different threads for multi-threaded device localization and environment reconstruction.

Another object of the embodiments herein is to leverage smart pointers to manage and share data across several threads.

SUMMARY

The above-mentioned needs are met by a computer-implemented method and system for managing and sharing data using smart pointers.

An example of a computer-implemented method for managing and sharing data using smart pointers includes obtaining original data and storing the original data in memory. Further, the computer-implemented method includes creating a smart pointer for the original data in a first thread. Furthermore, the computer-implemented method includes duplicating the smart pointer from the first thread to a second thread. Moreover, the computer-implemented method includes share the original data across the first thread and the second thread.

An example of a computer program product for managing and sharing data using smart pointers includes obtaining original data and storing the original data in memory. Further, the computer program product includes creating a smart pointer for the original data in a first thread. Furthermore, the computer program product includes duplicating the smart pointer from the first thread to a second thread. Moreover, the computer program product includes share the original data across the first thread and the second thread.

An example of a system for managing and sharing data using smart pointers includes a computing device. Further, the system includes a processor configured within the computing device and operable to perform: obtain original data and storing the original data in memory; create a smart pointer for the original data in a first thread; duplicate the smart pointer from the first thread to a second thread; share the original data across the first thread and the second thread.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

The above-mentioned needs are met by a computer-implemented method and system for managing and sharing data using smart pointers. The following detailed description is intended to provide example implementations to one of ordinary skill in the art, and is not intended to limit the invention to the explicit disclosure, as one or ordinary skill in the art will understand that variations can be substituted that are within the scope of the invention as described.

It will be appreciated by those skilled in the art that, the method described herein is generic and is not limited to specific device localization and environment reconstruction software or algorithm.

Environment Block Diagram

Figure 1:
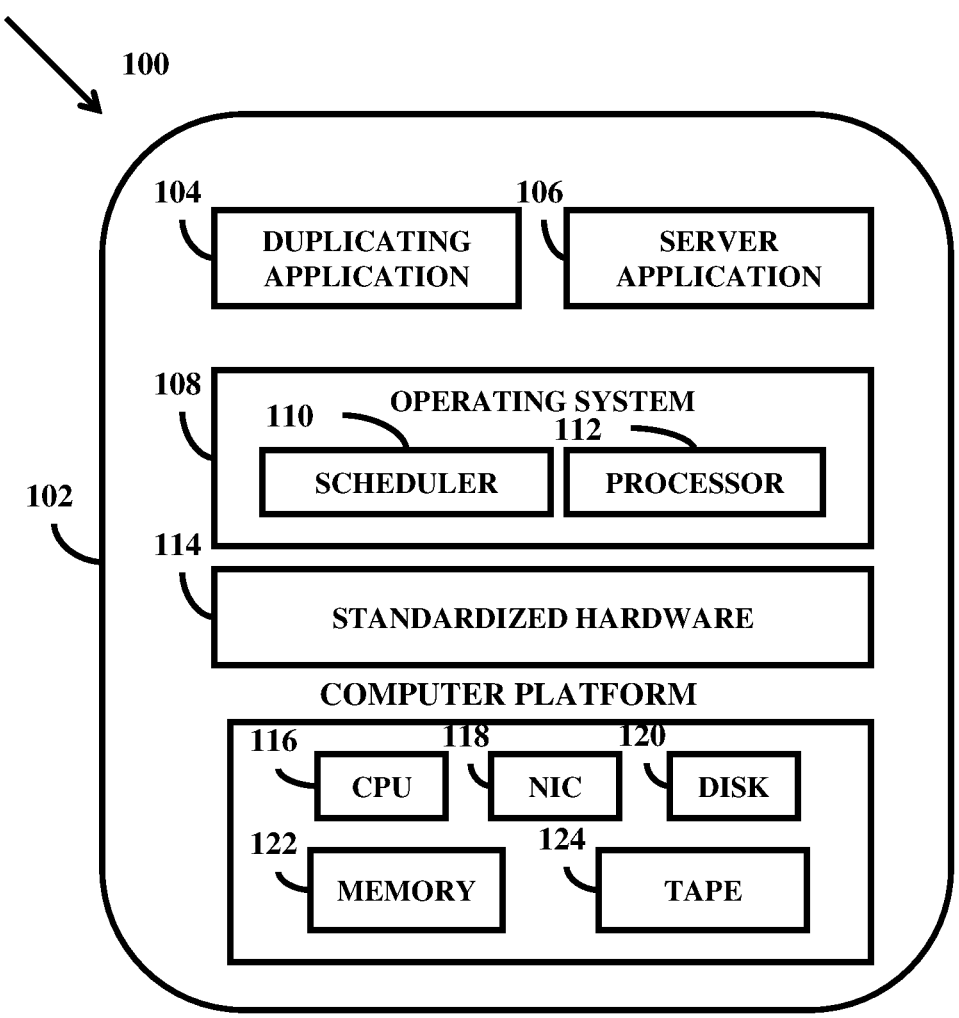
FIG. 1 is a block diagram of the environment, according to the embodiments as disclosed herein.

FIG. 1 is a block diagram of the environment, according to the embodiments as disclosed herein. As depicted in FIG. 1, the components of the environment 100 include a computing device 102 in which embodiments of the invention may be implemented. As shown, the computing device 102 is built on a computer platform. The computer platform includes a number of resources such as CPU 116, network devices 118, disk 120, memory 122 and tape mechanisms 124.

A duplication application 104 is provided and associated with the Operating System 108. Specifically, the duplication application 104 creates smart pointer for original data and then duplicates the smart pointer across one or more threads in the memory 122.

A server application 106 is provided and is associated with an operating system 108 and reads data into memory from storage and/or to write data to storage from the memory. It will be appreciated to those skilled in the art that, the application can be run on a server, a local machine, an embedded computer system or a mobile computer.

The operating system 108 may include, for example, Windows, Linux, Novell, Solaris and other operating systems such as FreeBSD and the like. Further, the operating system 108 includes a scheduler 110 and a processor 112. The scheduler 110 manages a plurality of threads independently. Typically, a thread is the smallest sequence of programmed instructions. Multiple threads may exist within a process and executes concurrently. The multiple threads may or may not share resources such as memory. Specifically, the threads of a process share its instructions (executable code) and its context (value of its variables).

Threads may be executed/processed by the processor 112 one at a time (commonly referred to as "Single threading") or may be executed in a group (referred to as "Multithreading"). Multithreading allows multiple threads to exist within the context of one process.

Typically, the computing device 102 is a portable electronic device configured with a user interface to interact with a user of the computing device 102. Examples of the computing device 102 include, but are not limited to, a personal computer (PC), laptops, a mobile phone, an I-pad, a tablet device, a personal digital assistant (PDA), a smart phone and a laptop. Examples of the user interface include, but are not limited to, display screen, keyboard, mouse, light pen, the appearance of a desktop, illuminated characters, help messages.

The computing device 102 includes a processor, memory, storage device, a high speed interface connecting to memory and high speed expansion ports and a low speed interface connecting to low speed bus and storage device. Each of the underlying components are interconnected using various busses and may be mounted on a common motherboard. The processor can process instructions for execution within the user device 102, including instructions stored in the memory or on a network to display graphical information for a graphical user interface (GUI) on an external input/output device such as display coupled to high speed interface. In other implementations, multiple processors and/or multiple buses may be used as appropriate along with multiple memories and types of memory.

A computer program product is tangibly embodied in the duplicating application 104. The computer program product also contain instructions that when executed perform the method described herein.

It should be appreciated by those of ordinary skill in the art that FIG. 1 depicts the computing device 102 in an oversimplified manner, and a practical embodiment may include additional components and suitably configured processing logic to support known or conventional operating features that are not described in detail herein.

Original data is obtained from and stored in memory. A smart pointer is created for the original data on a first thread. Typically, a pointer is a programming language object whose value refers to another value stored elsewhere in the memory using its address. The pointer references a location in memory and obtains the value stored at that particular location.

The smart pointer includes a "counter" field that is incremented by one for each copy of the smart pointer. Similarly, the "counter" field is decremented by one when a smart pointer is deleted.

When data needs to be transferred from one thread to another, smart pointers are duplicated. Consequently, the original thread that the data is copied from can freely delete the smart pointers without the risk of removing the original data that may be used by another thread.

Operational Flow Chart

Figure 2:
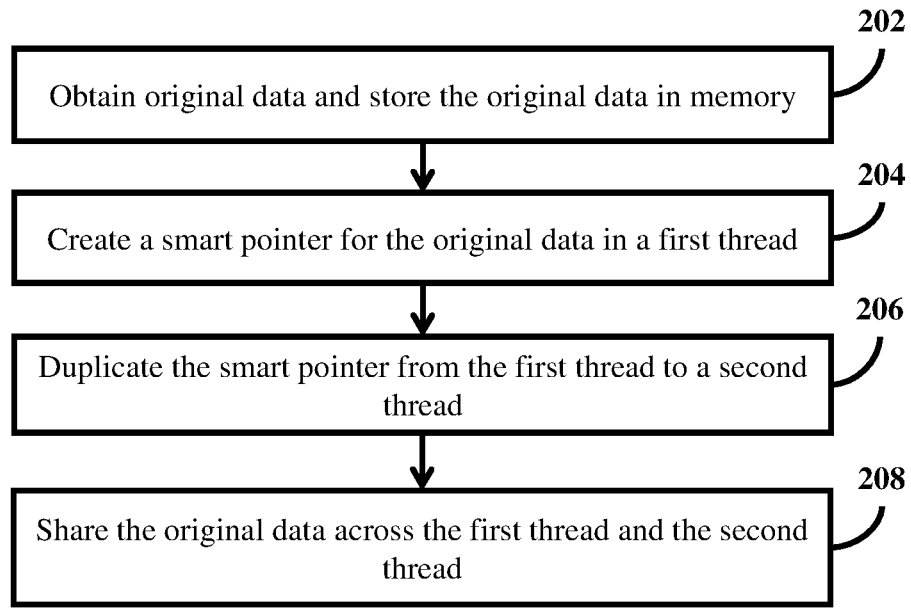
FIG. 2 is a flow chart describing a method for managing and sharing data across multiple threads, according to the embodiments as disclosed herein.

FIG. 2 is a flow chart describing a method for managing and sharing data across threads, according to the embodiments as disclosed herein. The method begins at step 202.

At step 202, original data is obtained and is stored in memory. Examples of the original data includes, but is not limited to, 2d features extracted from image input, 3d features estimated from the 3d reconstructed process, motion sensor measurements from gyroscope and accelerometer, key frame information estimated from localization process.

At step 204, a smart pointer for the original data is created in a first thread. The smart pointer is an abstract data type that simulates a pointer while providing additional features. The smart pointer is usually implemented as a class as follows:

Class SmartPointer {
int* counter;
Type* pointer;
}

In a multithread program, it is very common that two threads share the same data. For instance, consider thread A having a Type* pointer A=0x001 and thread B having a Type*pointer=0x001. Pointer A and Pointer B points to the same memory address hence thread A and B can share the same data. At times, a thread may decide to delete certain data that is no longer necessary. However, the data may still be needed by another thread. For instance, thread A may decide to delete the data in pointer A. However, the same data is required by thread B in pointer B. In such a case, if thread A deletes pointer A then thread B will crash since the data is deleted. To overcome this problem, smart pointers are used.

The smart pointer includes two fields, counter and pointer. The "counter" field automatically records the number of copies of the smart pointer.

A smart pointer "smart_ptrA(0x001)" in thread A and smart pointer "smart_ptrB(0x001) in thread B. The "counter" field of the smart pointer A and smart pointer B will be two. If thread A decides to delete the data in smart_ptrA, it will do "smart_ptrA.delete( )". As a result, the counter value drops to 1 (since thread B is still using it). The data in the smart pointer 0x001 still exists. Subsequently, if thread B decides to delete the data in smart_ptrB(0x001), the counter drops to 0. At this point, the smart pointer class defined in paragraph [0035] will delete data in 0x001 as there are no more copies of the smart pointer across the whole multi-threaded program.

At step 206, the smart pointer is duplicated from the first thread to a second thread.

Only the address of the original data is copied.

Copying and deleting data such as 3d map points, 2d image features, camera positions is very common for localization and reconstruction program. For instance, the same 3d map point data may be used by "tracking" thread and "map creation" thread. By using smart pointers, if a thread changes values of the 3d map point location, the change will affect the other threads immediately. Further, if all copies of the smart pointer are deleted, the memory will be released automatically by the destructor of the smart pointer.

At step 208, the original data is shared across the first thread and the second thread. The original data is shared as a result of duplicating the smart pointer described in step 206.

The method ends at step 208.

The method described herein solves localization and reconstruction problems in several applications other than augmented reality, virtual reality, robot and unmanned aerial vehicle.

Further, the method described herein is beneficial for several reasons as listed below:
 a) Duplicating smart pointers is a lightweight operation.
 b) Duplication of smart pointers is a very fast operation and therefore does not decrease the efficiency of the program.
 c) Using smart pointers provides users the flexibility to create copies of data and the freedom to "delete" the copies in any threads without damaging other threads.
 d) The complete copy of the original data can only be stored once and used as smart pointers by all the threads, and thus significantly reduce the memory requirement compared to storing the original data as multiple complete copies in different threads.
 e) The method described herein is memory efficient.

Schematic Representation of Duplicating Smart Pointers

Figure 3:
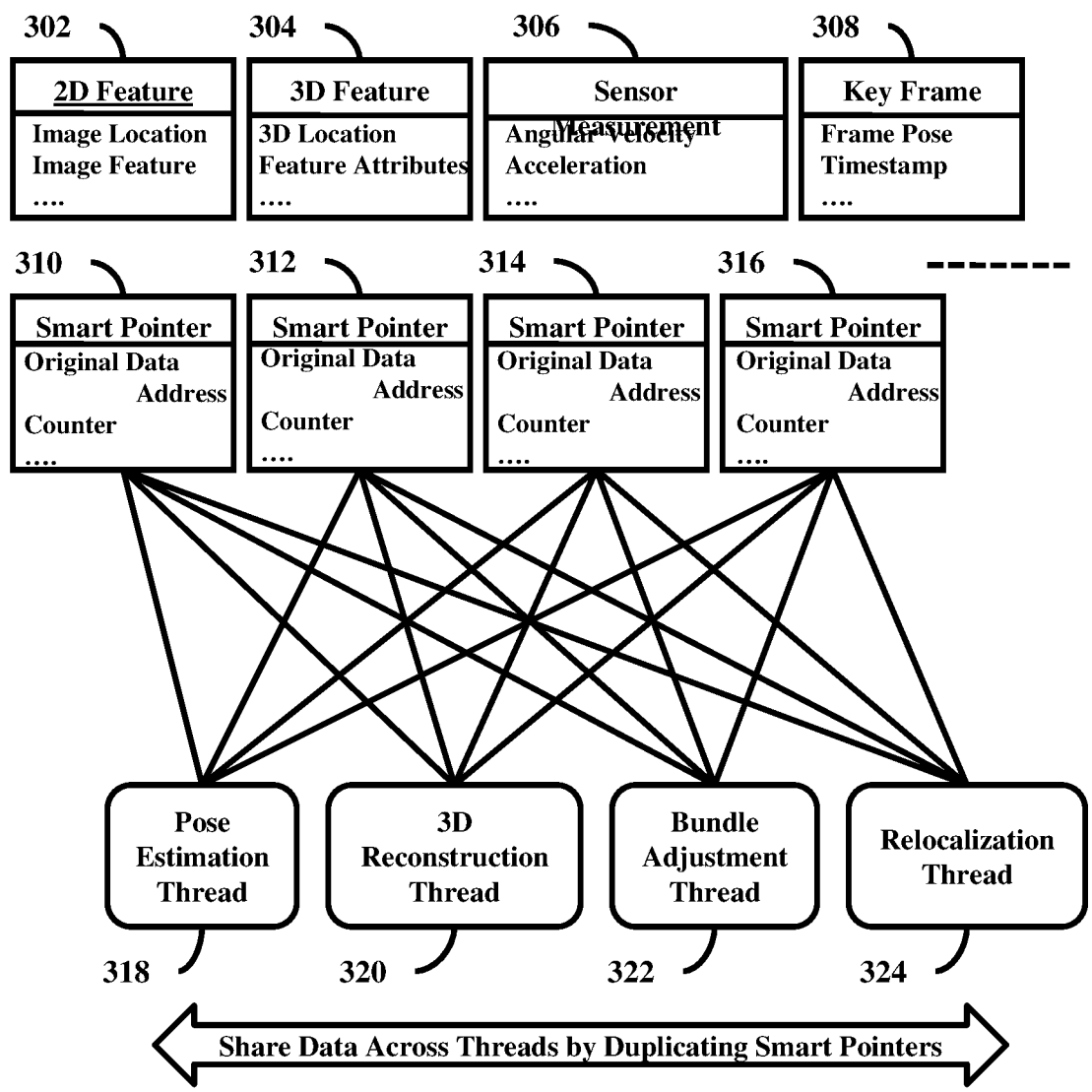
FIG. 3 is a schematic representation of duplicating smart pointers to share data across multiple threads, according to embodiments as disclosed herein.

FIG. 3 is a schematic representation of duplicating smart pointers to share data across multiple threads, according to embodiments as disclosed herein.

Original data includes 2d features extracted from image input 302, 3d features estimated from 3d reconstruction process 304, motion sensor measurements from gyroscope and accelerometer 306 and key frame information estimated from localization process 308.

Smart pointers for instance, smart pointer 310, smart pointer 312, smart pointer 314, smart pointer 316, are created for the original data. Typically, the smart pointers include original data address and a counter.

A classic localization and reconstruction software program includes several threads (features). The threads include a pose estimation thread 316, feature extraction thread 318, a global optimization thread 318 (for instance, bundle adjustment) and a relocalization thread 320.

The threads store the smart pointers and not the original data. At the time of data transfer between the threads, only the smart pointers are duplicated.

System Block Diagram

Figure 4:
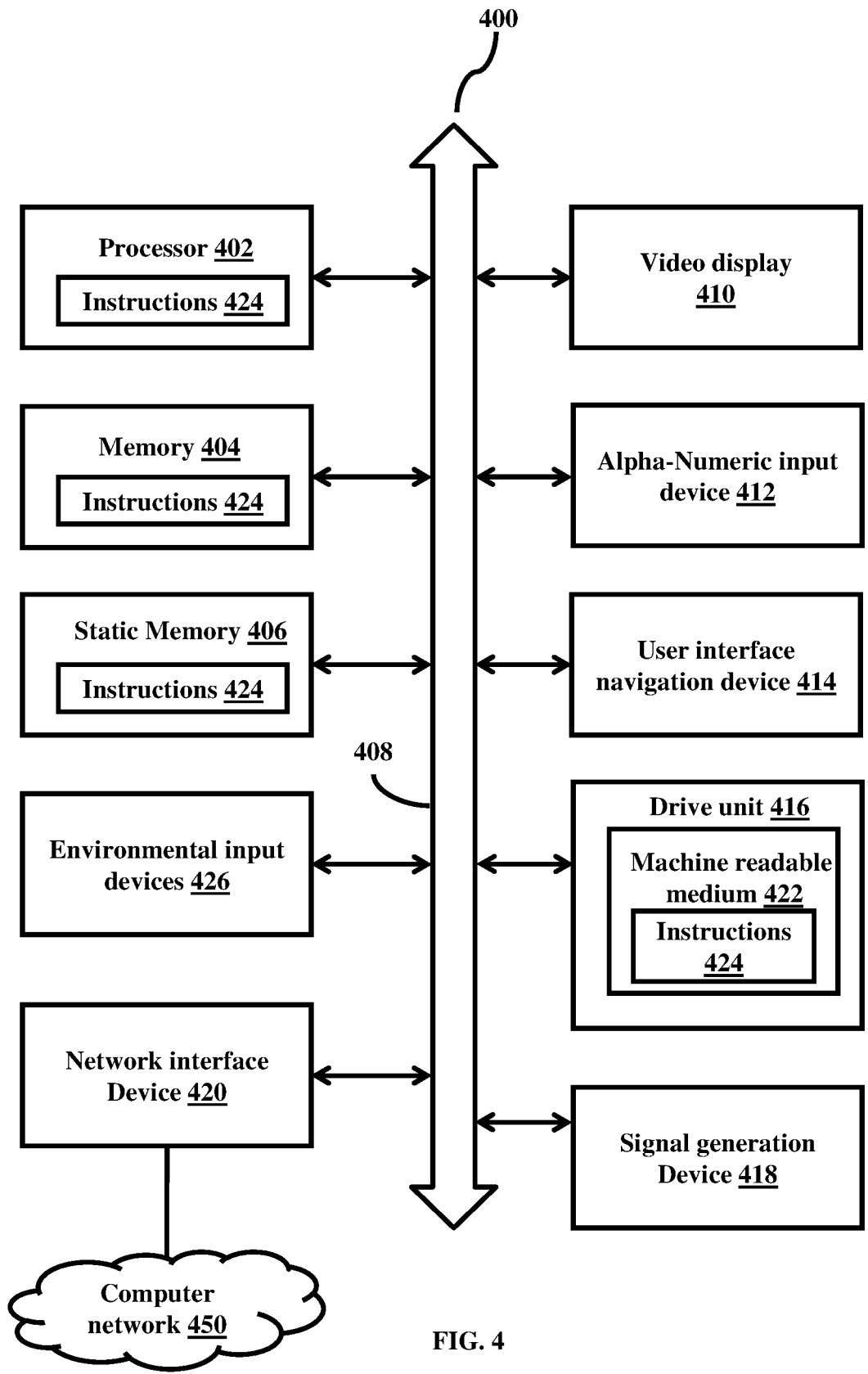
FIG. 4 is a block diagram of a machine in the example form of a computer system within which instructions for causing the machine to perform any one or more of the methodologies discussed herein may be executed.

FIG. 4 is a block diagram of a machine in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU), or both), a main memory 404, and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker), and a network interface device 420. The computer system 400 may also include a environmental input device 426 that may provide a number of inputs describing the environment in which the computer system 400 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions 424 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks. Transmission Medium The instructions 424 may further be transmitted or received over a computer network 450 using a transmission medium. The instructions 424 may be transmitted using the network interface device 420 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method for managing and sharing data using smart pointers, the computer-implemented method comprises:

obtaining original data and storing the original data in a memory in a multi-threaded device localization and environment reconstruction system including a pose estimation thread, a 3D reconstruction thread, a bundle adjustment thread and a relocalization thread;

creating a smart pointer for the original data in a first thread, wherein the smart pointer comprises a memory address of the original data and an integer counter, the created smart pointer pointing to the memory address and the integer counter indicating a number of the smart pointer;

duplicating the smart pointer from the first thread to a second thread, wherein the first thread and the second thread are different threads included in the multi-threaded device localization and environment reconstruction system, the duplicated smart pointer comprising the memory address of the original data and the integer counter, the created and duplicated smart pointers pointing to the memory address of the original data and integer counters included in the smart pointers indicating numbers of the smart pointers, and creating a look-up table by the second thread, wherein the look-up table comprises a plurality of smart pointers amongst multiple threads;

sharing the original data in the memory across the first thread and the second thread via the memory address of the original data;

deleting the smart pointer within the first thread in response to the first thread deleting a part of the original data; and releasing the memory by a destructor of the created and duplicated smart pointers, when the created and duplicated smart pointers are deleted.

2. The computer-implemented method of claim 1 and further comprising:

incrementing the integer counter in response to duplicating the smart pointer once.

3. The computer-implemented method of claim 1 and further comprising:

decrementing the integer counter in response to deleting the smart pointer once.

4. The computer-implemented method of claim 3 and further comprising:

checking if the integer counter is zero; and deleting the original data by deleting a corresponding last thread of the same data in response to the integer counter being zero.

5. The computer-implemented method of claim 4 wherein deleting the original data is completely and safely deleted in the memory.

6. The computer-implemented method of claim 1 and further comprising:

deleting one or more smart pointers corresponding to the same data in a plurality of threads.

7. The method of claim 1, wherein the original data is 3-dimensional map point data, the first thread is a map creation thread, the second thread is a tracking thread, and the method further comprises:

changing the 3-dimensional map point data by the map creation thread to affect the tracking thread, by using the smart pointer created in the map creation thread and the smart pointer duplicated from the map creation thread to the tracking thread, the created and duplicated smart pointers pointing to a memory address of the 3-dimensional map point data.

8. The method of claim 1, wherein the smart pointer is implemented as a class.

9. A non-transitory computer-readable medium storing a computer program that, when executed by a processor, causes the processor to perform a method for managing and sharing data using smart pointers, wherein the method comprises:

obtaining original data and storing the original data in a memory in a multi-threaded device localization and environment reconstruction system, wherein the first thread and the second thread are different threads included in the multi-threaded device localization and environment reconstruction system;

creating a smart pointer for the original data in a first thread, wherein the smart pointer comprises a memory address of the original data and an integer counter, the created smart pointer pointing to the memory address and the integer counter indicating a number of the smart pointer;

duplicating the smart pointer from the first thread to a second thread, wherein the first thread and the second thread are different threads included in the multi-threaded device localization and environment reconstruction system, the duplicated smart pointer comprising the memory address of the original data and the integer counter, the created and duplicated smart pointers pointing to the memory address of the original data and integer counters included in the smart pointers indicating numbers of the smart pointers and creating a look-up table by the second thread, wherein the look-up table comprises a plurality of smart pointers amongst multiple threads;

sharing the original data in the memory across the first thread and the second thread via the memory address of the original data;

deleting the smart pointer within the first thread in response to the first thread deleting a part of the original data; and releasing the memory by a destructor of the created and duplicated smart pointers, when the created and duplicated smart pointers are deleted.

10. The computer program product of claim 9 and further comprising:

incrementing the integer counter in response to duplicating the smart pointer once.

11. The computer-program product of claim 9 and further comprising:

decrementing the integer counter smart pointer in response to deleting the smart pointer once.

12. The computer program product of claim 11 and further comprising:

checking if the integer counter is zero; and deleting the original data by deleting a corresponding last thread of the same data in response to the integer counter being zero.

13. The computer program product of claim 12 wherein deleting the original data is completely and safely deleted in the memory.

14. The computer program product of claim 9 and further comprising:

deleting one or more smart pointers corresponding to the same data in a plurality of threads.

15. A system for data management and sharing using smart pointers, the system comprising:

a memory;

a computing device in a multi-threaded device localization and environment reconstruction system including a pose estimation thread, a 3D reconstruction thread, a bundle adjustment thread and a relocalization thread; and a processor configured within the computing device and operable to:

obtain original data and storing the original data in the memory;

create a smart pointer for the original data in a first thread, wherein the smart pointer comprises a memory address of the original data and an integer counter, the created smart pointer pointing to the memory address and the integer counter indicating a number of the smart pointer;

duplicate the smart pointer from the first thread to a second thread, wherein the first thread and the second thread are different threads included in the multi-threaded device localization and environment reconstruction system, the duplicated smart pointer comprising the memory address of the original data and the integer counter, the created and duplicated smart pointers pointing to the memory address of the original data and integer counters included in the smart pointers indicating numbers of the smart pointers and creating a look-up table by the second thread, wherein the look-up table comprises a plurality of smart pointers amongst multiple threads;

share the original data in the memory across the first thread and the second thread via the memory address of the original data; and release the memory by a destructor of the created and duplicated smart pointers, when the created and duplicated smart pointers are deleted.

16. The system of claim 15, further comprising: a scheduler to manage one or more threads.

\* \* \* \* \*